United States Patent
Knotek-Smith et al.

(10) Patent No.: US 12,077,461 B2
(45) Date of Patent: Sep. 3, 2024

(54) METHOD FOR TREATING REDUCIBLE COMPOUND RESIDUES USING IRON-CONTAINING BIOREACTOR

(71) Applicant: United States of America—US Army, Alexandria, VA (US)

(72) Inventors: Heather Marie Knotek-Smith, Vicksburg, MS (US); David Lyman Smith, Vicksburg, MS (US)

(73) Assignee: UNITED STATES of AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/721,886

(22) Filed: Sep. 30, 2017

(65) Prior Publication Data

US 2023/0055262 A1    Feb. 23, 2023

Related U.S. Application Data

(62) Division of application No. 14/685,311, filed on Apr. 13, 2015, now abandoned.

(60) Provisional application No. 61/978,581, filed on Apr. 11, 2014.

(51) Int. Cl.
| | |
|---|---|
| *C02F 3/28* | (2023.01) |
| *C02F 1/70* | (2023.01) |
| *C02F 3/00* | (2023.01) |
| *C02F 3/34* | (2023.01) |
| *C02F 101/00* | (2006.01) |
| *C02F 103/00* | (2006.01) |
| *C02F 103/06* | (2006.01) |

(52) U.S. Cl.
CPC ............ *C02F 3/2806* (2013.01); *C02F 1/705* (2013.01); *C02F 3/2813* (2013.01); *C02F 3/284* (2013.01); *C02F 3/346* (2013.01); *C02F 2003/001* (2013.01); *C02F 2003/003* (2013.01); *C02F 2101/003* (2013.01); *C02F 2103/001* (2013.01); *C02F 2103/007* (2013.01); *C02F 2103/06* (2013.01); *C02F 2203/006* (2013.01)

(58) Field of Classification Search
CPC ...... C02F 3/2806; C02F 3/2813; C02F 3/284; C02F 1/705; C02F 3/346; C02F 2101/003
See application file for complete search history.

(56) References Cited

U.S. PATENT DOCUMENTS 6,719,902 B1 * 4/2004 Alvarez ................. B09C 1/002
                                                                210/903

* cited by examiner

*Primary Examiner* — Ryan B Huang
(74) *Attorney, Agent, or Firm* — Brian C. Jones

(57) ABSTRACT

An iron containing bioreactor for treating explosive compounds and other organics in contaminated surface water is disclosed. The bioreactor can be located either on-ground or in-ground at a location across which contaminated surface water flows. In one configuration the reactor is made up of (i) indigenous microbes, (ii) acetate, (iii) a low density iron-containing bed, and contains anaerobic zones in at least one portion of the flowpath. The reactor reduces the concentration of explosive compounds to below 10 ppb and also maintains this explosive compound reduction level for a period of at least one year without replenishing the microbes or iron.

15 Claims, 4 Drawing Sheets

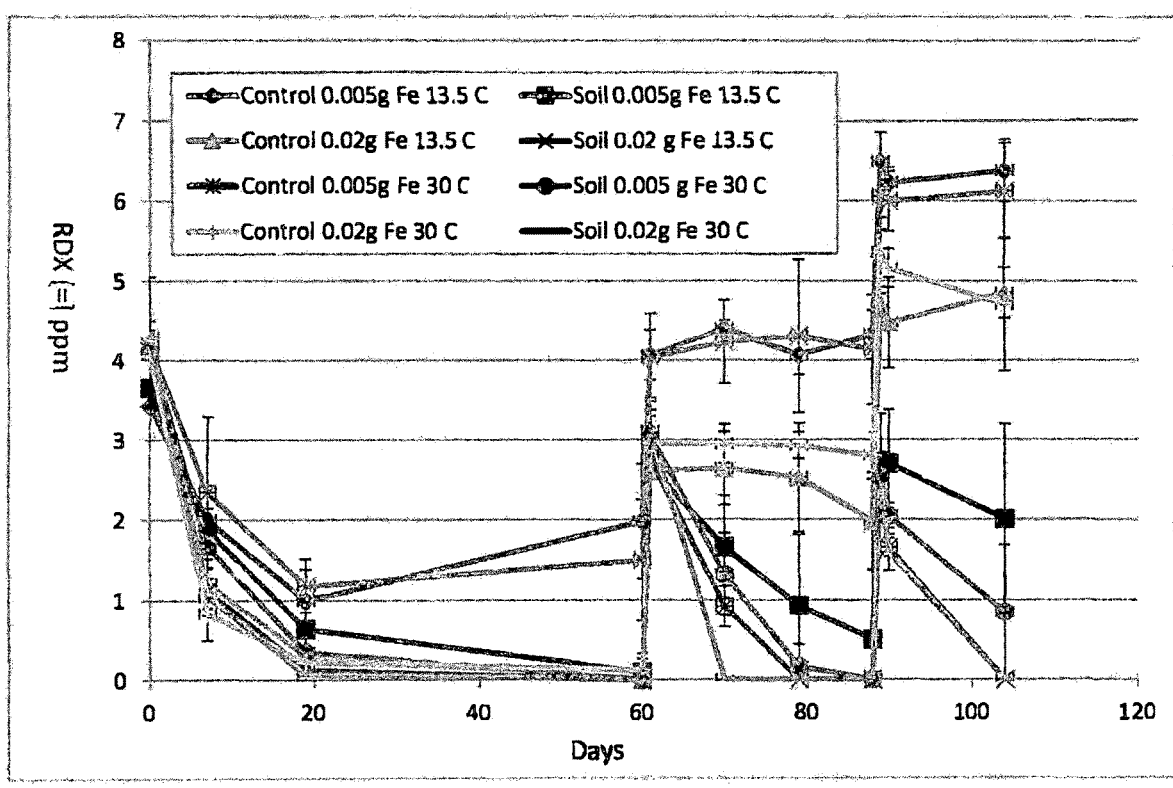
Figure 1. Results of Iron containing Bioreactors fed sodium acetate with additional RDX on days 60 and 88.

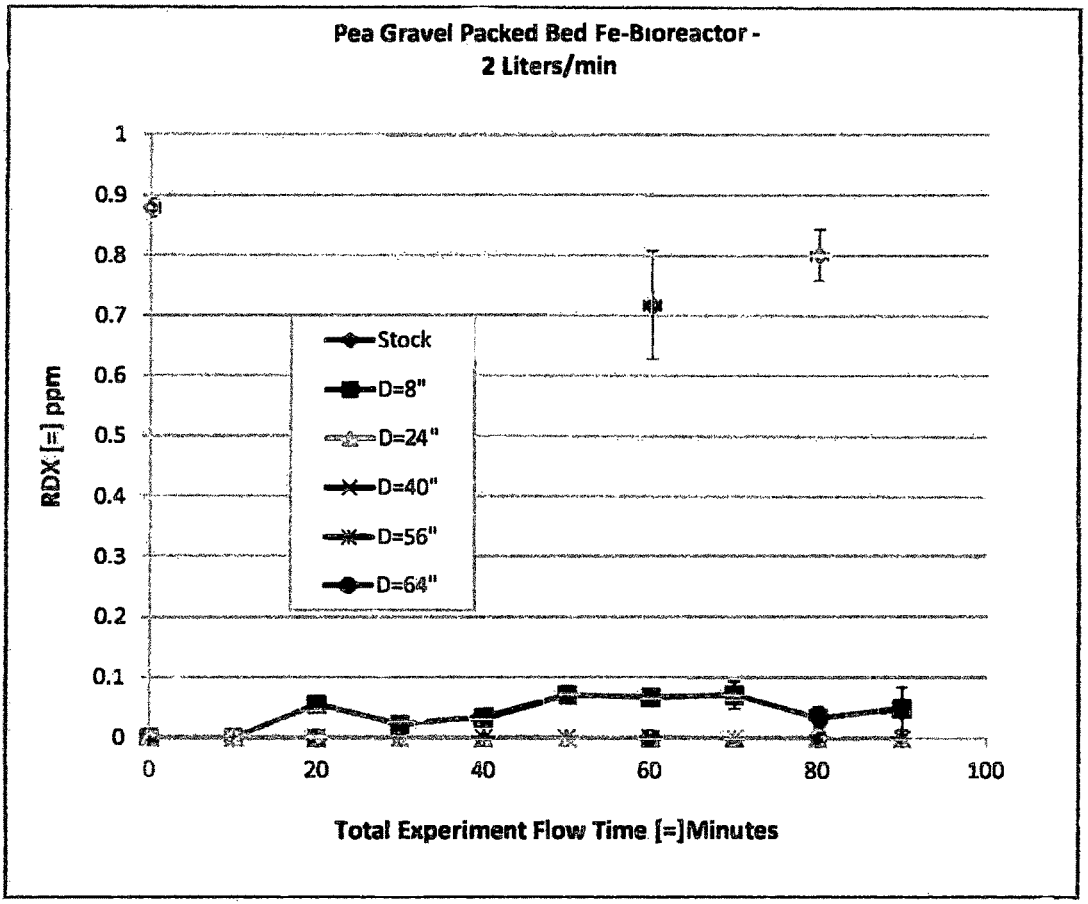
Figure 2. Pea Gravel Packed Bed Fe-Bioreactor Run 1. Flowrate = 2 liters/minute. Treatment water influent approximately 0.8 ppm. RDX was detected at flow distance 8" (approximately 6.6 minutes residence time) after 20 minutes of flow time. No RDX was detected past this point for the entire run.

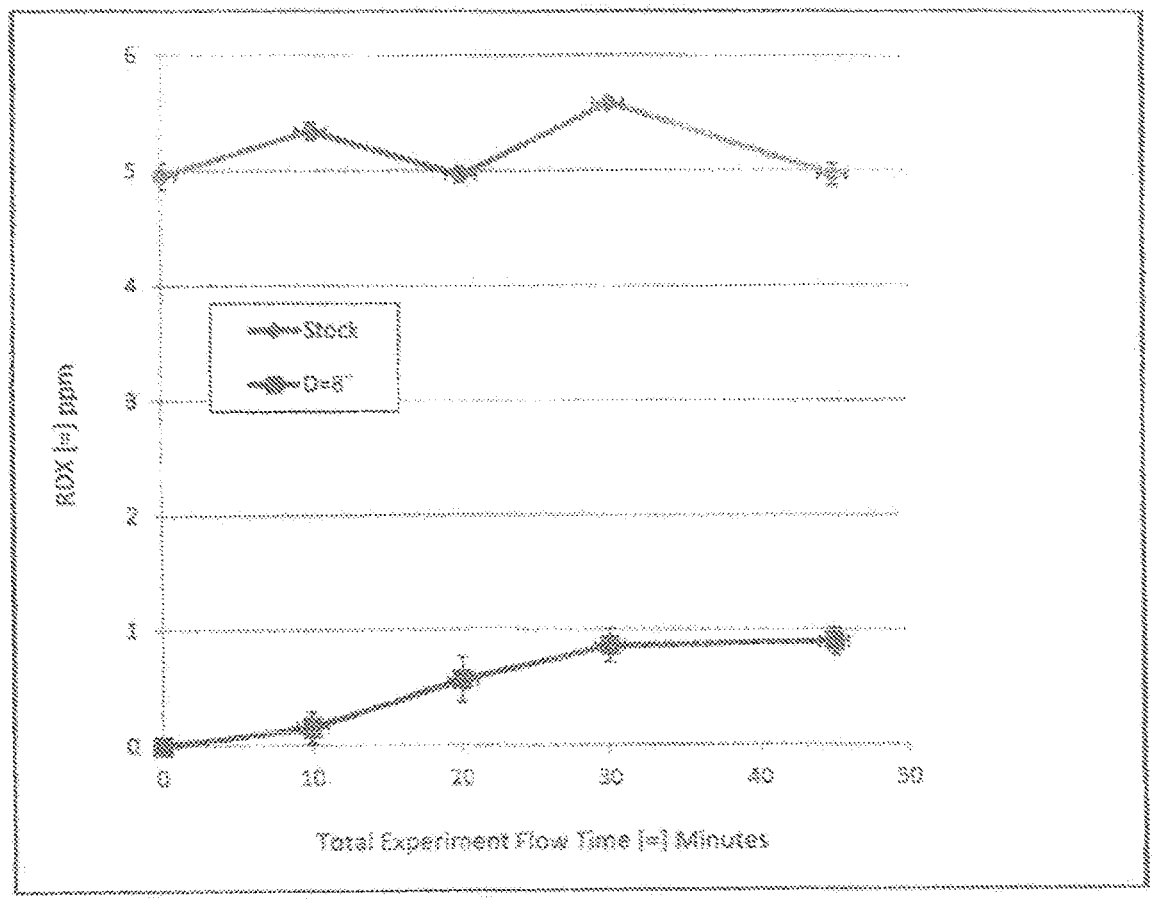
Figure 3a. Pea Gravel Packed Bed Fe-Bioreactor Run 2. Flowrate = 2.2 liters/minute. Treatment water influent approximately 5 ppm RDX and 11 ppm Bromide. RDX was detected at a flow distance of 8" (approximately 6 minutes residence time) after 10 minutes of flow time. No RDX was detected past this point for the entire run.

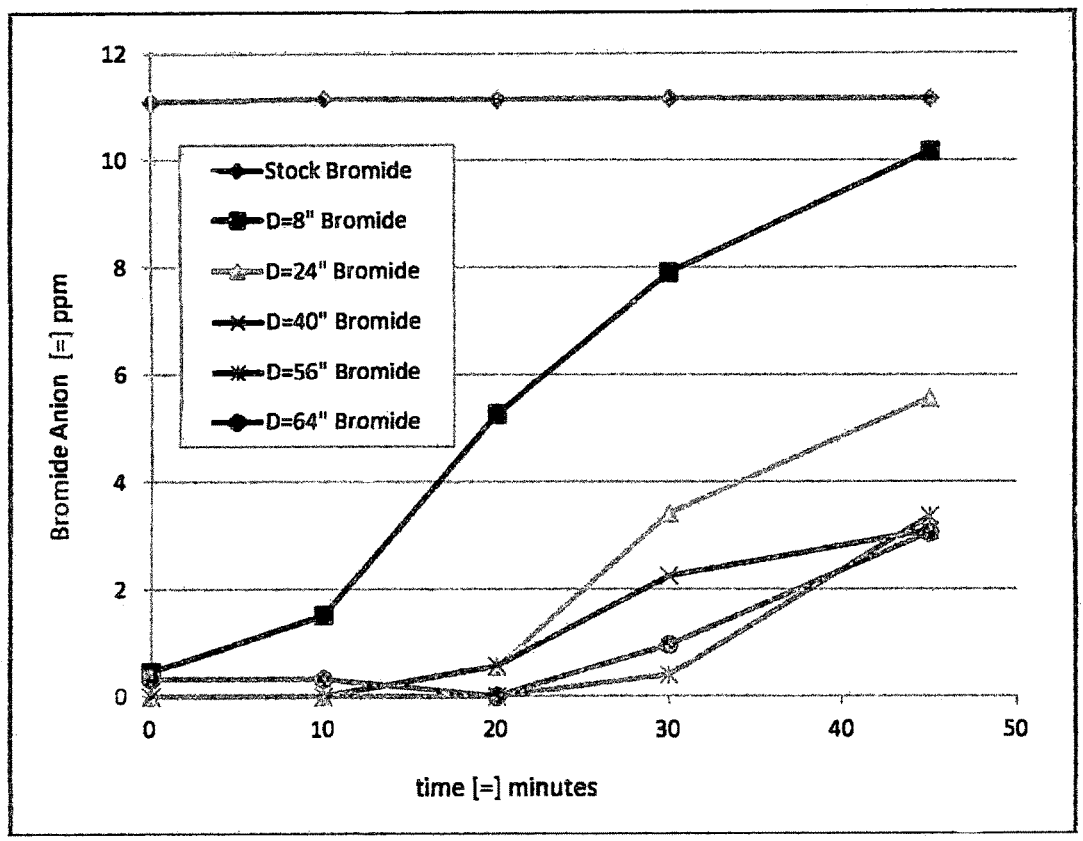
Figure 3b. Reactor Run 2. Flowrate 2.2 liters/minute. Treatment water influent approximately 5 ppm RDX and 11 ppm Bromide. Detection of Bromide at cells downstream of flow distance 8" (the only port where RDX was detected) demonstrates that the decline of RDX is due to degradation.

METHOD FOR TREATING REDUCIBLE COMPOUND RESIDUES USING IRON-CONTAINING BIOREACTOR

FIELD OF THE INVENTION

The invention provides a low-cost, iron-based bioreactor treatment method and apparatus that reduces munition or other reducible organic residue in run-off and groundwater, in particular RDX residue, and improves surface and ground water quality where such runoff and/or residues are present.

BACKGROUND OF THE INVENTION

Residues of munitions compounds such as hexahydro-1,3,5-trinitro-1,3,5-triazine (RDX) can enter the environment from manufacturing and storage sites as well as through military training activities. Due to its low solubility in water (7.6 mg/L at 25° C.) much of the RDX detected in wastewater consists of undissolved particulates. RDX is also not extensively sorbed on soils, therefore its presence in, and transport towards, groundwater is of vital importance.

RDX degradation has been studied, and in the article "Bio-geochemical Factors that Affect RDX Degradation," Felt et al., *International Journal of Soil, Sediment and Water* (2009; Vol. 2, Issue 2:4) degradation of RDX under iron-reducing conditions was studied in biological and chemical systems. The article describes as an obstacle to using in-situ approaches to treatment of RDX contaminated groundwater a lack of information of the factors that influence transformation of the RDX compounds.

Generally, it would be desirable to have a low-cost, iron-based bioreactor treatment method and apparatus that reduces munition or other reducible organic residue in run-off and groundwater, in particular RDX residue, and would improve surface and ground water quality where such runoff and/or residues are present.

Specifically, it would be desirable to have a low-cost, iron-based bioreactor treatment method and apparatus that reduces munition or other reducible organic residue in run-off and groundwater, in particular RDX residue, which does not require specialized and/or costly microbes.

Specifically, it would be desirable to have a low-cost, iron-based bioreactor treatment method and apparatus that reduces munition or other reducible organic residue in run-off and groundwater, in particular RDX residue, which does not require large amounts of iron.

Specifically, it would be desirable to have a low-cost, iron-based bioreactor treatment method and apparatus that reduces munition or other reducible organic residue in run-off and groundwater, in particular RDX residue, which may be operated in-situ and without the need to add materials to the reactor for long periods of time.

Specifically, it would be desirable to have a low-cost, iron-based bioreactor treatment method and apparatus that reduces munition or other reducible organic residue in run-off and groundwater, in particular RDX residue, in which the iron used to reduce the munitions compound(s) is self-regenerated within the reactor.

SUMMARY OF THE INVENTION

The invention provides a low-cost, iron-based bioreactor treatment method and apparatus that reduces munition or other reducible organic residue in run-off and groundwater, in particular RDX residue, and improves surface and ground water quality where such runoff and/or residues are present.

Specifically, the invention provides a low-cost, iron-based bioreactor treatment method and apparatus that reduces munition or other reducible organic residue in run-off and groundwater, in particular RDX residue, which does not require specialized and/or costly microbes. In embodiments of the invention, indigenous microbes may be used.

Specifically, the invention provides a low-cost, iron-based bioreactor treatment method and apparatus that reduces munition or other reducible organic residue in run-off and groundwater, in particular RDX residue, which does not require large amounts of iron. In embodiments of the invention, the iron containing bed has a low volume density.

Specifically, the invention provides a low-cost, iron-based bioreactor treatment method and apparatus that reduces munition or other reducible organic residue in run-off and groundwater, in particular RDX residue, which may be operated in-situ and without the need to add materials to the reactor for long periods of time. In embodiments of the invention, the reactor and the method of the invention do not require replenishing either microbes or iron for at least one year.

Specifically, the invention provides a low-cost, iron-based bioreactor treatment method and apparatus that reduces munition or other reducible organic residue in run-off and groundwater, in particular RDX residue, in which the iron used to reduce the munitions compound(s) is self-regenerated within the reactor. In embodiments of the invention, the reaction is self-regenerative via contacting the explosive compounds with iron whereby the iron is reduced, followed by contacting the reduced iron with the microbes whereby said iron is returned to the oxidized state and therefore capable of donating electrons to munitions compounds in a repetitive manner. The invention involves not only the use of iron, but also the use of microbial systems to re-reduce the iron. This allows the use of much less iron and alleviates problems associated with iron swelling and clogging in conventional iron reactor systems used to reduce munitions residues in run-off and groundwater.

In embodiments of the invention, by including iron in a bioreactor system, it is an advantage of the invention that organic contaminants can be degraded (i.e., treated) at significantly higher oxidation-reduction potentials than if the reactors contained only a biological culture or a chemical reductant (iron). If the Eh is significantly higher, it is a further advantage of the invention that the residence time in the reactor and the holding capacity of the reactor can be reduced. Embodiments of the invention will have a significant impact on treatment plant designs, as the residence time of any bioreactor must be sufficient to achieve the appropriate Eh. Because the residence time and holding capacity of the reactors can be reduced in embodiments of the invention, it greatly reduces the operating and maintenance costs associated with bioreactor treatment of explosive residues and also increases treatment efficiencies. Installation of reactors in accordance with the invention will be possible in water treatment plants as well as on site military training range management of contaminants.

In embodiments of the invention, the iron containing bioreactor may be used for treating explosive compounds and other organics in contaminated surface water, the bioreactor may be located either on-ground or in-ground at a location across which said contaminated surface water flows. The bioreactor may comprise (i) indigenous microbes, (ii) acetate, (iii) a low density iron-containing bed, and (iv) containing anaerobic zones in at least one portion of the flowpath, wherein the reactor reduces a concentration of the explosive compounds to below 10 ppb, or to below 5 ppb, and maintains the explosive compound reduction level for a period of at least one year, at least 5 years, or at least 10 years, without replenishing the microbes or iron.

In embodiments of the invention, the bioreactor may have a liner forming a cavity within which the microbes, acetate and iron are placed. The bioreactor may have a cover layer. In embodiments of the invention, the bioreactor may have at least one baffle. The baffles may project downward from the top of the reactor, upward from the bottom of the reactor, or both. The height of the baffles may be up to 50% of the reactor height, up to 60% of the reactor height, up to 70% of the reactor height, up to 80% of the reactor height, or up to 90% of the reactor height.

In embodiments of the invention, the bioreactor and the reaction method may operate from about 32° F. to about 65° F. The low density iron-containing bed may further comprise a packing material which may be selected from the group consisting of rocks, wood chips, mulch, gravel, stone, peat, sand, activated carbon, biochar, and combinations thereof. The low density iron bed may be less than about 30%, less than about 20% by volume, or less than about 10% by volume iron.

In embodiments of the method of the invention, a method for removing explosive compounds from contaminated surface water uses the above-described bioreactor. The method may comprise the steps of: (a) providing an iron containing bioreactor with anaerobic zones, the bioreactor comprising (i) indigenous microbes, (ii) acetate (iii) a low density iron-containing bed, and (iv) an anaerobic zone in at least one portion of the flowpath, (b) providing a flow of contaminated water into the bioreactor, and (c) contacting the explosive compounds or other reducible organic contaminant with the low density iron whereby said iron is reduced. In addition, the method of the invention is self-sustaining for long periods of time because of the further step of: (d) contacting said reduced iron with said microbes whereby said iron is oxidized, so that (e) steps (c) and (d) are repeated such that a concentration of explosive compounds is lowered to below 10 ppb, or to below 5 ppb, in the treated water for the extremely long time periods described above, without replenishing said microbes or iron.

BRIEF DESCRIPTION OF THE DRAWINGS

FIG. 1 shows the results of the bioreactor proof of concept demonstrations.

FIG. 2 shows the results of one run of the mesoscale packed bed iron-bioreactor.

FIG. 3a shows the results of another run of the mesoscale packed bed iron-bioreactor.

FIG. 3b shows the results of another run of the mesoscale packed bed iron-bioreactor.

DETAILED DESCRIPTION OF THE INVENTION

Definitions of remediation and degradation, terms often used interchangeably in connection with RDX, but having slightly different definitions, follow:

Remediation—The action of remedying something, especially the reversal or stopping of damage to the environment.
Bioremediation—microbes (bugs).
Degradation—The breakdown of an organic compound such as RDX and other explosives.
Biotic—microbes (bugs)
Biodegradation—transfer of electron ($e^-$)
Abiotic—chemical (iron)
Reduction—transfer of electron ($e^-$)

The chemical structure of RDX is known. The degradation of RDX occurs by transfer of electron(s) to the molecule. This is true for all types of degradation, i.e., abiotic (chemical), zero valent iron (ZVI), reduced iron, microbial degradation, bioremediation, biodegradation, etc.

In the biodegradation of RDX it is important to note that for RDX to be broken down by microbes (bugs), all other electron acceptors (other than RDX) that give the microbes more energy than RDX will be "used" or contacted first. Often this occurs by contact with other bugs in the environment. One process known to occur in the bioremediation of RDX is that by the point in time at which the microbes intended to reduce RDX are doing so (other higher energy reactions having been completed) the necessary carbon source has been depleted. So, as a consequence, more carbon source must be added. This means that such a process requires constant monitoring and carbon source addition. Moreover, this can also cause overgrowth and biofouling, and the reactor plugs. Alternatively, the (i) ambient temperature in the cold months, (ii) the normal ground temperature, and/or (iii) the temperature of cold weather ground runoff can kill off the specific microbes needed when the system design has been to use non-indigenous microbes, i.e., "augmented" or "bio-augmented" microbes not in accordance with the invention.

Abiotic degradation of RDX is a common method of breaking down organics. However, in this method the electrons on the iron are consumed, and once those electrons are transferred from the iron, the iron has no more degradation capacity. In order for the abiotic degradation of RDX to continue in this method constant monitoring is required as well as iron addition. Additionally, once iron is rusted (iron oxide), the iron oxide has greater volume and it begins to swell and stick to neighboring oxidized iron, which often forms a mass of rusted iron which can (i) clog the reactor and (ii) must be removed for the reaction to be restored. For these reasons and others, this is not a desirable remediation process for RDX.

In accordance with the invention there is a coupled process wherein abiotic degradation of RDX (or other organics or contaminants) occurs, coupled with a biotic restoration of the oxidized iron to the reduced state via microbial transfer of electrons to the iron which in turn provides energy to the microbes. In other words, in embodiments of the invention, iron reduces the contaminant, and then the indigenous microbes in accordance with the invention will re-reduce the iron. So, the indigenous microbes in accordance with the invention do not reduce the RDX (as in other proposed biotic process schemes), they reduce the iron so that the iron in turn can reduce the RDX.

One of the drivers of this inventive process is the discovery that, in the method and reactor in accordance with embodiments of the invention, the microbes or bugs get much more energy from passing an electron to iron as compared to RDX. It is often true that custom bio-augmented microbes which are capable of reducing RDX do not get as much energy from that reaction, so they are out competed by other microbes and die.

A field design of a packed bed iron bioreactor in accordance with embodiments of the invention is envisioned and is quite similar to the design of the prototype packed bed iron-bioreactor used at a military installation grenade range and described below.

A fixed bed iron bioreactor or tank iron bioreactor in accordance with embodiments of the invention, is envisioned for applications which may have a higher volume flow stream.

Proof-of-Concept Testing

Proof-of-Concept testing was performed using bioreactors utilizing iron and inoculated with soil as well as sand filled columns with and without iron amendments. The results of the bioreactor proof of concept demonstrations can be seen in FIG. 1. FIG. 1 results represent the concentrations measured in liquid media syrum vials containing 50 ml of minimal media. Additional sodium acetate and RDX was added on day 60 and additional RDX was added on day 88. It can be seen that the RDX in the soil inoculated vials was degraded in approximately 10-20 days.

FIG. 1 also shows that although an abiotic system (iron only) may work initially regardless of the concentration of iron or the temperature (all four controls), eventually the iron reaches its capacity and RDX breakthrough will occur if additional RDX is added to the system. In contrast, the four different systems in accordance with the invention (soil+iron) all retain RDX degrading capacity after both day 60 and day 88 events wherein RDX is added to the system. This is true regardless of the temperature or the iron concentration, and it is anticipated that the lower 0.005 g iron samples at both temperatures would have eventually degraded the RDX at time periods in excess of 110 or 120 days had the experiment been continued. As also can be seen, the 0.02 g iron samples in accordance with the invention quickly degraded the RDX even after the second additional RDX dosing (i.e., three total doses) at 88 days.

The Proof-of-Concept testing demonstrated RDX and its intermediates break down rapidly when in the presence of reduced iron.

In embodiments of the invention directed to liquid reactors, maintenance of the reduced environment within the vessel as well as maintenance of the iron fluidized bed within the vessel are both important design considerations.

In embodiments of the invention directed to fixed bed reactors, concentration of iron in the low-density iron bed (i.e., within the packing of the reactor) is an important design consideration. An iron concentration too high is costly, and also could create blocking of the reactor. The resulting channeling of flow will decrease the effectiveness of the treatment system, even if large amounts of iron are used.

Experiments in accordance with embodiment of the invention were conducted at ground water temperatures utilizing soil as an inoculant, i.e., the source of microbe mixed population. Iron in the form of iron filings was found to be an excellent reductant for the RDX. This is due to the toxicity of iron citrate to many iron reducers. In addition, the addition of a carbon source, for example, sodium acetate, was important for effective consortia development from the starter soil and degradation of the RDX.

It was found that the inoculated cultures were able to degrade the RDX through 3 rounds of addition while the controls only degraded the RDX in the first round of RDX addition. In certain embodiments of the invention, reactors may be designed that degrade the RDX in a flow through configuration. Tests involving certain embodiments of the invention demonstrate that flow through soil columns containing sand, iron, soil, and acetate are effective to treat high levels of RDX contamination.

As discussed above, when an iron source, e.g., iron filings, are added to a biologically active iron reducing culture, RDX degrades at a faster rate and at a higher oxidation-reduction potential than biologically or chemically poised cultures.

In the reactor and method in accordance with the invention iron reduces and degrades the RDX or other organic such as perchlorate by transferring an electron to the molecule making it unstable enough to breakdown. Once the iron has transferred its available electrons it is oxidized and can no longer reduce the RDX, until an iron reducing microbe re-reduces the iron. The re-reduction of the iron can occur during water treatment. However, it is believed that most of the reduction occurs after the flow event especially when additional nutrient is added through feed tubes to feed the microbial population.

Mesoscale and Prototype Experiments

A mesoscale test was run in the laboratory and a prototype installation was constructed to capture runoff from a 40 mm grenade range at a military installation.

The packed bed design of the bioreactor(s) included: packing: gravel (or other support media), iron metal, and mulch. The lined flow chamber was a clear plastic tank in the mesoscale lab tests and an impermeable fabric lined ditch in the prototype installation. Flow baffles were used in both instances. The mesoscale packed bed iron-bioreactor had dimensions of (20" wide by 20" height by 50" length) and volume was 280 liters with a total void volume of 100 liters or 36%. The mesoscale packed bed iron-bioreactor utilized baffles oriented normal to the direction of flow to force the flow through the depth of the reactor. There were three baffles in the mesoscale reactor, two high baffles 20" wide by 17" height placed 3.5" above the reactor bottom, and one low baffle 20" wide×16" height placed on the bottom. This created 4 cells measuring 20" wide by 18" height by 12" length, each with a sample tube placed in the horizontal center of the cell with its opening 8 inches below the reactor packing surface. The flow distances at each sample cell (1-4) port and waste collection tubes were 8", 24", 40", 56" and 64" respectively. The residence time at each site was dependent on the flowrate. The packing of the mesoscale packed bed iron-bioreactor was 5.5 cu ft of pea gravel, 5.5 cu ft of cypress mulch, and 13.75 kg of iron filings.

Results of one run of the mesoscale packed bed iron-bioreactor are shown in FIG. 2. The feed into the reactor was approximately 0.85 ppm RDX at a flow rate of 2 liters per minute. RDX was detected at flow distance of 8" (approximately 6.6 minutes residence time) after 20 minutes of flow time. No RDX was detected past this point for the entire run.

Results of another run of the mesoscale packed bed iron-bioreactor are shown in FIGS. 3a and 3b. The feed into the reactor was approximately 5 ppm RDX and 10 to 11 ppm bromide at a flow rate of 2.2 liters per minute for 45 minutes. In FIG. 3a it is seen that RDX was detected at flow distance of 8" (approximately 6 minutes residence time) after 10 minutes of flow time. No RDX was detected past this point for the entire run. In FIG. 3b it is seen that detection of bromide at cells downstream of flow distance of 8" (the only port where RDX was detected) demonstrates that the decline of RDX was due to degradation.

A prototype packed bed iron-bioreactor was installed at a grenade range located at Iowa Army Ammunition Plant (IAAAP) 30 Nov. 2012. The reactor installed at a military installation. The prototype packed bed iron-bioreactor measured 5 feet wide by 30 feet long with a minimum depth of 2.5 feet from grade. A Duraskrim® liner (www.usfabrics.com) was placed and then the baffles were placed. Some of the reactor packing was placed and then the feeding tubes were installed behind the lower baffles. Additional packing was added followed by the high level baffles. After all packing had been mixed (15 cu yards of rock mixed with mulch and iron) a capping layer of rock was placed with a minimum depth of 6 inches. The total amount of packing added to the reactor consisted of 15 cu yards of 2.5 cm river rock, 3 cu yards of cypress mulch, and 500 kg of fine iron metal.

For in-situ iron-bioreactors such as the prototype packed bed iron-bioreactor installed at a grenade range, depending on weather conditions and runoff volume, the reactor bed is not at steady state. In terms of what portion of the reactor bed is anaerobic, that is largely determined by several factors. It is generally considered that at any given time, some portions of the in-situ iron-bioreactors packed bed are anaerobic, and some are not. It is generally accepted that water flowing through a portion of the in-situ iron-bioreactor is needed to create an anaerobic portion. So, it is a possibility that in periods of no moisture, the reactor bed will dry out. However, when the packed bed is tasked with new contaminated runoff, it will convert back to an anaerobic state in such portions of the reactor.

Regarding the particular carbon source used, although many are possible within the scope of the invention, acetate is an expedient to the process in accordance with the invention because it (i) works well at the lower ground water temperatures, (ii) functions well at high RDX input concentrations, and (iii) functions to complete breakdown of the RDX, i.e., reduces and/or eliminates any possible RDX intermediate concentration in the iron bioreactor effluent.

As described above, the invention is not intended to be limited to the remediation and/or degradation of RDX. Other contaminants such as organics, perchlorate which is widely found in many waste water and runoff compositions, all may have applicability to treatment by (i) the methods and/or (ii) in the iron bioreactor in accordance with embodiments of the invention.

Fully incorporated by reference herein, and originally filed as an Appendix to the specification, is an Application Data Sheet entitled "FUNDAMENTALS OF ORP MEASUREMENT" (ADS 43-014/rev. B May 2008) from ROSEMOUNT® Analytical and Emerson Process Management fully describing the theory, instrumentation, measurement techniques, and measured values of oxidation-reduction potential, such measured values being a feature of the appended claims herein.

What is claimed is:

1. A method for removing explosive compounds from contaminated surface water using a bioreactor, said bioreactor located either on-ground or in-ground at a location across which said contaminated surface water flows, said method comprising the steps of:
   (a) providing an iron-containing bioreactor with anaerobic zones, said bioreactor comprising (i) indigenous microbes, (ii) acetate (iii) low density iron in a low density iron-containing bed, and (iv) an anaerobic zone in at least one portion of the location across which said contaminated surface water flows;
   (b) providing a flow of said contaminated surface water into said bioreactor, (c) contacting said explosive compounds with said low density iron whereby said low density iron is reduced,
   (d) contacting said reduced iron with said indigenous microbes whereby said reduced iron is oxidized, and
   (e) repeating steps (c) and (d) such that a concentration of said explosive compounds is lowered to below 10 ppb in treated surface water, and wherein an explosive compound reduction level to below 10 ppb in treated surface water is maintained for a period of at least one year without replenishing said indigenous microbes or low density iron.

2. The method of claim 1 wherein said bioreactor further comprises at least one baffle, said baffle oriented to create an area of the bioreactor upstream of said baffle and an area of the reactor downstream of said baffle.

3. The method of claim 2 wherein said bioreactor has a plurality of baffles.

4. The method of claim 1 wherein said bioreactor further comprises at least one lower baffle, said lower baffle oriented to create an area of the bioreactor upstream of said lower baffle and an area of the reactor downstream of said lower baffle, said bioreactor having a vertical height of said cavity, wherein said lower baffle extends upward from a bottom of said cavity and has a height no more than half of the vertical height of said cavity.

5. The method of claim 4 wherein said bioreactor further comprises at least one upper baffle, said upper baffle oriented to create an area of the bioreactor upstream of said upper baffle and an area of the reactor downstream of said upper baffle, said bioreactor having a vertical height of said cavity, wherein said upper baffle extends downward from a top of said cavity and has a height no more than half of the vertical height of said cavity.

6. The method of claim 5 wherein said bioreactor has a plurality of lower baffles and upper baffles.

7. The method of claim 1 wherein said bioreactor further comprises a cover layer.

8. The method of claim 1 wherein said bioreactor has an operating temperature from about 32° F. to about 65° F.

9. The method of claim 1 wherein said bioreactor reduces said concentration of said explosive compounds to below 5 ppb.

10. The method of claim 1 wherein said low density iron-containing bed further comprises a packing material.

11. The method of claim 10 wherein said packing material is selected from the group consisting of rocks, mulch, gravel, stone, peat, sand, activated carbon and combinations thereof.

12. The method of claim 1 wherein the oxygen-reduction potential, measured in millivolts, in at least one portion of said low density iron-containing bed is less than 0.0 mV.

13. The method of claim 1 wherein said reactor reduces a concentration of said explosive compounds to below 10 ppb and maintains said explosive compound reduction level for a period of at least ten years without replenishing said microbes or low density iron.

14. The method of claim 1 wherein said low density iron-containing bed is less than about 30% by volume iron.

15. The method of claim 1 wherein said low density iron-containing bed is less than about 10% by volume iron.

* * * * *